INVENTOR
CHARLES DONALD COWLES
BY
ATTORNEY

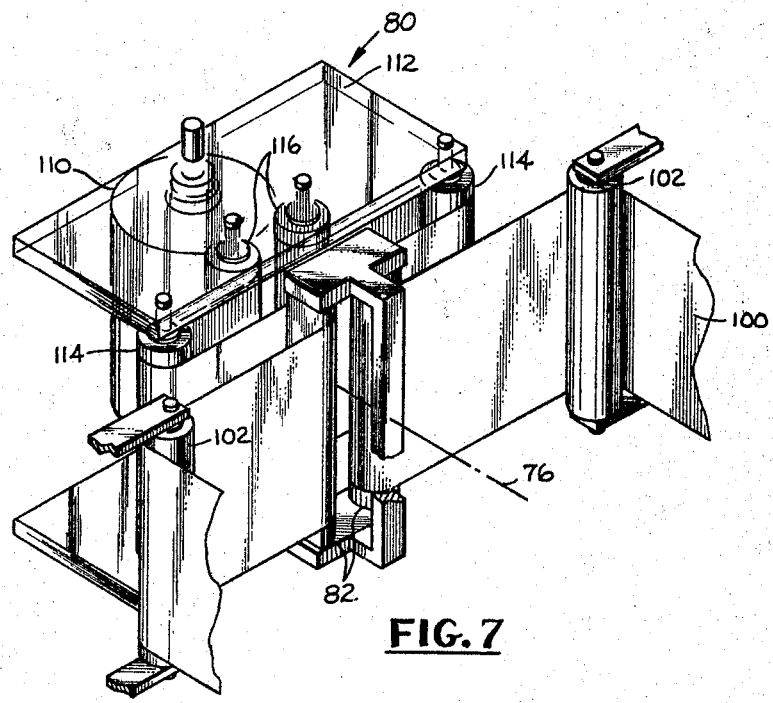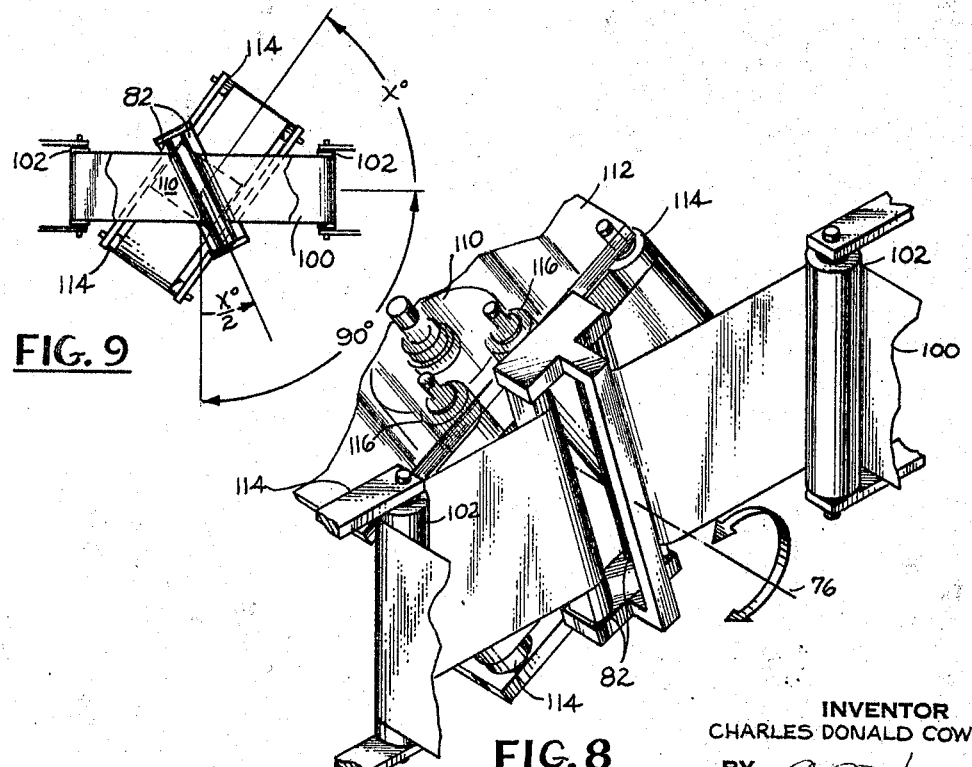

INVENTOR
CHARLES DONALD COWLES
BY
ATTORNEY

United States Patent Office 3,434,639
Patented Mar. 25, 1969

3,434,639
TRANSPORTS FOR ELONGATED MATERIAL
Charles Donald Cowles, West Redding, Conn., assignor to The Perkin-Elmer Corporation, Norwalk, Conn., a corporation of New York
Filed Jan. 7, 1966, Ser. No. 519,374
Int. Cl. B65h 25/26, 25/32; G03b 1/02
U.S. Cl. 226—21                                   11 Claims

ABSTRACT OF THE DISCLOSURE

A self-aligning skew bar for a strip, aligned by the tension and reaction forces in the strip. The strip enters and exits from the generally convex cylindrically shaped skew bar in parallel planes. Guide means are provided for guiding the material to and from the skew bar. The guide means and the skew bar are pivotal about axes which are substantially coincident.

---

This invention relates to transports for elongated material. More particularly it relates to transports for strip materials, such as photographic film, magnetic recording tape, paper, screens, webs, fabrics, foils, plastic films, and the like.

The invention provides a self-adjusting skew bar, turning bar, or angle bar for guiding elongated material from one path to another path, forming an angle therewith; the two paths lying in parallel planes. The self-adjusting skew bar of the invention allows the angle between the two paths to be varied at will without adversely affecting the transporting elongated material.

The invention further provides a skew twisting transport for elongated material, comprising a pair of self-adjusting skew bars according to the invention mounted on a common axis, whereby a moving portion of an elongated material may have its path adjusted through an angle of 180°.

Transports for guiding elongated material, formed into thin webs or strips, are used in many industries, for example, paper making and printing; cloth manufacture and printing; the making of metal foils, plastic tapes and films; photography and film processing; and recording. An important problem arises in all such transports when the strip material must be transported through a skewed path. In such a path, not only the plane of motion of the elongated material changes as in passing around a roller, but the entering and leaving paths are at an angle.

Whereas, rollers are used to guide elongated material through a mere change in plane of motion, other means must be provided for a skew path. Prior art methods include using a fixed skew bar at an angle to the path of motion of the elongated material or warp twisting the elongated material. Strips guided by fixed skew bars are notoriously unstable and require constant adjustment, or servo control in order to prevent wandering of the strip material along the axis of the skew bar. Warp twisting requires a very long free length of strip material in the twist which must elastically deform the material in order to prevent any permanent distortion in the material.

In many instances, it is desirable to transport strip material through a skew path, e.g., to turn it over, or to provide a processing station at an angle to a supply or takeup station, or to provide a compact transport, or the like.

All prior art methods of guiding transporting strip material through a skew path adversely affect the strip. Strip tension and velocity may be uneven across the strip or may vary with time. The strip may wander transversely to its path of motion. Perfect adjustment of the transport is impossible. Constant adjustment thereof to meet processing needs is expensive, impractical or impossible. Consequently, skew paths have been avoided wherever possible.

In some cameras the image provided by the optical system of the camera pivots or oscillates about an axis. Examples are scanning cameras or those mounted on moving vehicles. In order to prevent the recording of a blurred picture, the film on which the image is being recorded must be transported through a path oscillating about this same axis. According to the prior art, this might be done by variably warp twisting the film in its path to and away from the image; or by mounting the entire film transport including the supply and takeup spools on a support oscillating with the image. The web twisting solution has the disadvantages previously described. The latter solution requires the mounting of a large mass which cannot respond to rapid oscillations or requires excessive amounts of power to do so.

It is, therefore, an object of the present invention to provide an improved transport for elongated material.

Another object of the invention is to provide such a transport that permits the elongated material to move through a skewed path.

A further object of the invention is to provide such a transport for elongated material that allows the elongated material to move through a skewed path of variable angle.

Another object of the invention is to provide a skew twisting transport for elongated material, providing an oscillating path for such elongated material.

Still another object of the invention is to provide a self-aligning skew bar for a transport for elongated material.

Yet another object of the invention is to provide apparatus of the above character that does not disturb the motion or tension in the elongated material.

A further object of the invention is to provide apparatus of the above character that is entirely self-aligning.

A still further object of the invention is to provide apparatus of the above character that does not disturb the tracking, alignment, or feed velocity of elongated material in a transport mechanism.

Still another object of the invention is to provide apparatus of above character operated by forces of reaction in the elongated material.

Yet another object of the invention is to provide an oscillating or scanning camera, the moving parts of which have low inertia.

A further object of the invention is to provide such a camera employing a film transport of the above character.

Still another object of the invention is to provide the supply and takeup means of a web transport on a common axis.

A further object of the invention is to provide a compact camera wherein the supply and takeup spools are so located.

Another object of the invention is to provide apparatus of the above character having low coefficients of friction.

Other objects of the invention will in part be obvious and will in part appear hereinafter.

The invention accordingly comprises the features of construction, combinations of elements, and arrangements of parts that will be exemplified in the constructions hereinafter set forth. The scope of the invention will be indicated in the claims.

For a fuller understanding of the nature and objects of the invention, reference should be had to the following detailed description taken in connection with the accompanying drawings in which:

FIGURE 7 is an enlarged fragmentary perspective view of the skew twisting transport of FIGURE 6;

FIGURE 8 is a view similar to FIGURE 7 of the skew twisting transport of FIGURE 6 showing the film plane of the camera of FIGURE 5 rotated with respect to the supply and takeup mechanism of the camera;

FIGURE 9 is a top view of FIGURE 8;

The same reference characters refer to the same elements throughout the several views of the drawings.

Figure 1:
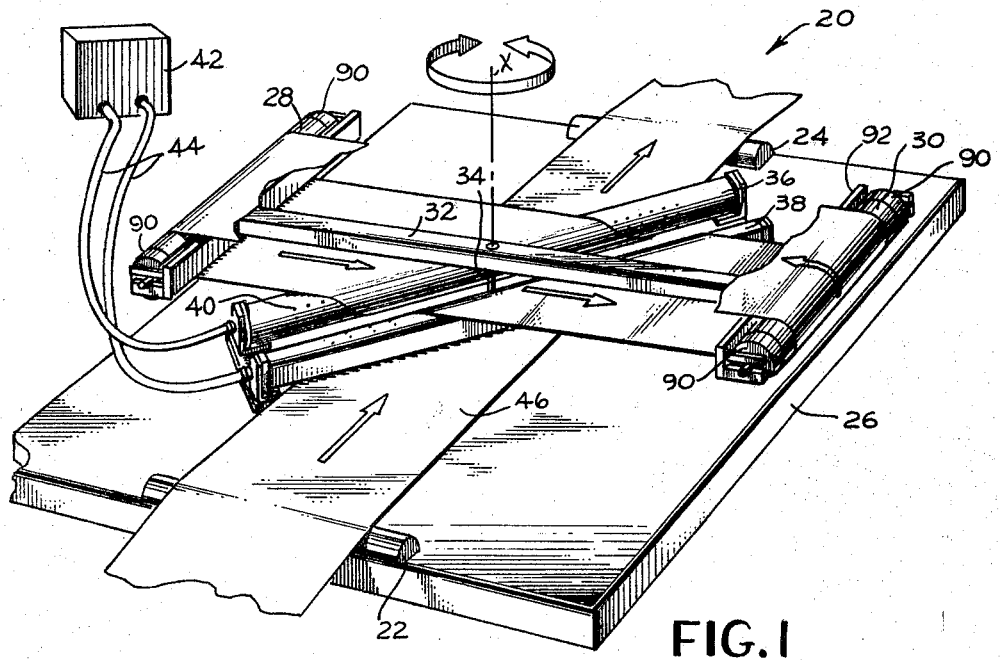
FIGURE 1 is a perspective view of a skew twisting transport for strip material according to the present invention.

A skew twisting transport 20, according to the invention, is shown in FIGURE 1. It comprises a pair of guides 22 and 24, mounted to a fixed support 26. A pair of freely rotatable rollers 28 and 30 are mounted to a horizontal arm 32. Arm 32 is pivotably supported on a shaft 34 mounted to support 26. A pair of skew bars 36 and 38 are mounted parallel to each other and are freely pivotable about shaft 34. The skew bars 36 and 38 are provided with a plurality of air holes 40 in their surfaces. Air is pumped from a pump 42 via tubes 44 to the interior of skew bars 36 and 38 and exits from the holes 40. This provides an air bearing for the strip 46 transported through the transport 20 by conventional drive means, not shown.

Figure 10:
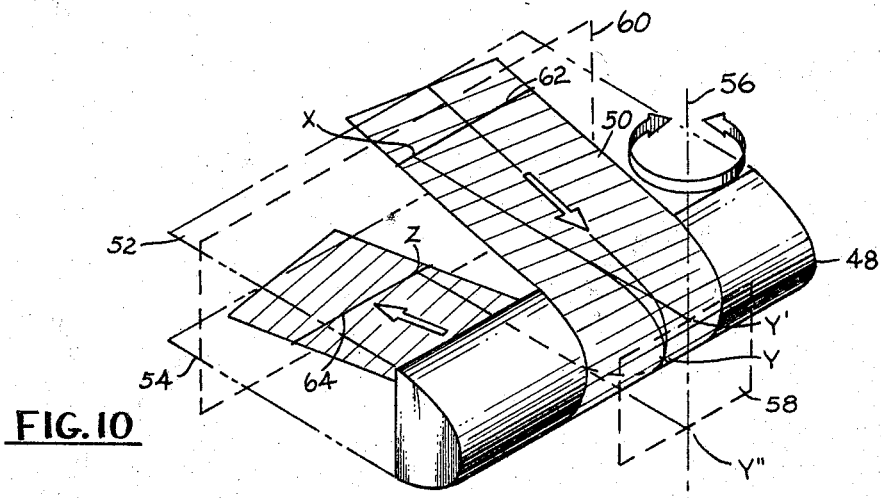
FIGURE 10 is a perspective diagrammatic view of a single skew bar according to the present invention.

Each skew bar is arranged with respect to its associated guide 22 or 24 and roller 30 or 28 to guide the strip 46 in the manner shown schematically in FIGURE 10. As shown therein, a skew bar 48 has a strip or web 50 passing around it. The guides or rollers associated with the skew bar 48 provide that the path of the strip 50 toward and away from the skew bar 48 lie in the parallel planes 52 and 54. The surface of the skew bar 48 is that of a convex cylinder. As shown in FIGURE 10, it is symmetrical in shape, but this is not required. It is only required that the surface of the skew bar 48 be generated by a plurality of straight lines parallel to the planes 52 and 54.

The invention provides an axis 56 about which the skew bar 48 is free to pivot. The axis 56 is perpendicular to the planes 52 and 54 and lies in a plane 58 precisely located with respect to the surface of the skew bar 48. A plane 60 perpendicular to the planes 52 and 54 and parallel to the surface of the skew bar 48 will intersect planes 52 and 54 along parallel lines 62 and 64. The plane 58 is located one-half the distance between intersections 62 and 64 as measured in the planes 52 and 54 and along the surface of the skew bar 48. Thus, referring to FIGURES 10, 11 and 12, the distance XY is equal to the distance ZY and to the distances XY' and XY" between the parallel planes 60 and 58.

Figure 11:
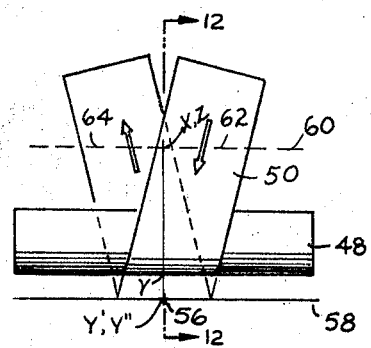
FIGURE 11 is a top view of the skew bar of FIGURE 10.

If the guides for the strip 50 are located such that the center of the strip intersects the axis 56 as shown in FIGURE 11, the tension and reaction forces in the strip along the center line will be precisely balanced with respect to the axis 56 as will the forces in all other longitudinal elements of the strip 50. It is as though the strip 50 were reflected in the plane 58. If the center of the strip 50 does not intersect the axis 56, the resulting forces on the strip and the skew bar 48 will cause the strip 50 to move sidewise and the bar 48 to rotate until the center line does intersect the axis 56 as shown in FIGURE 11.

Furthermore, the path of the strip 50 towards or away from the skew bar 48 may vary in angle in the planes 52 and 54 and such will be compensated for by rotation of the skew bar 48 about the axis 56.

Again referring to FIGURE 1, each of the skew bars 36 and 38 are located with respect to the shaft 34 in the same way as the skew bar 48 of FIGURE 10 is located with respect to the axis 56. Since the pivot axes of the skew bar 36 and 38 are along the common pivot line X, they may freely pivot together. The guide 22 and the roller 30 define the parallel planes of entrance and exit of the strip 46 from the skew bar 38 as do guide 24 and roller 28 for the skew bar 36. It is not necessary that the path of the web 46 above the rollers 28 and 30 be parallel to the paths of entrance and exit from the skew bars 36 and 38. Nor is it required that the skew bars 36 and 38 be the same size so that the planes of entrance and exits are separated by the same distance as shown. It would be quite possible for the strip 46 to follow a slanted path from the roller 30 to the roller 28, if, for example, roller 30 were larger than roller 28 or skew bar 38 were thicker than skew bar 36.

The arrangement of the parallel skew bars 36 and 38, shown in FIGURE 1, provides a skew twisting transport 20 whereby the rollers 28 and 30 may be rotated together to completely change the direction of the path of the web 46 above the rollers 28 and 30. Thus, in the top view of the skew twisting transport of FIGURE 1, shown in FIGURE 2, the top web travels from left to right and the path is turned 90° with respect to the entrance and exit path of the web 46. Note that the skew bars are then located at an angle of 45° with respect to these two axes.

Figure 3:
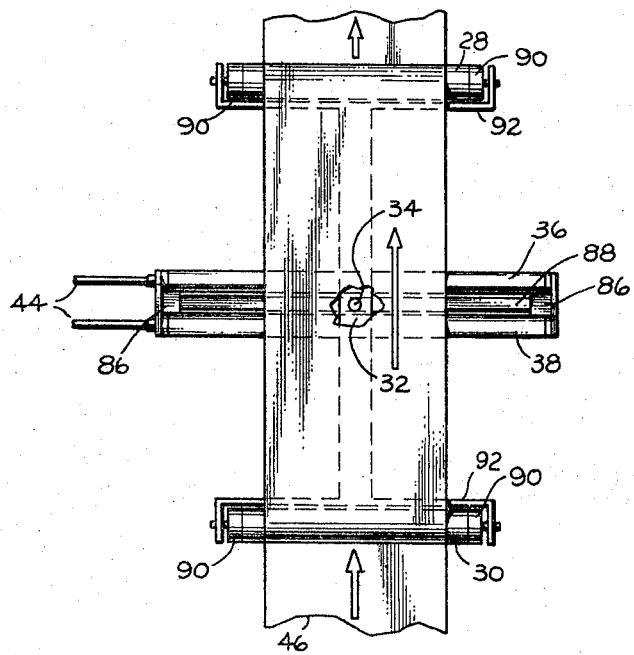
FIGURE 3 is a top view similar to FIGURE 2 but with the transport rotated 90° from its position shown in FIGURE 2.

Referring to FIGURE 3, it will be seen that the rollers 28 and 30 have been turned 90° so that the topmost path of the web 46 is now parallel to the entrance and exit paths of the web 46 from the skew twisting transport 20. Note that the skew bars 36 and 38 have rotated 45° to accommodate this 90° rotation of the rollers 28 and 30.

Figure 4:
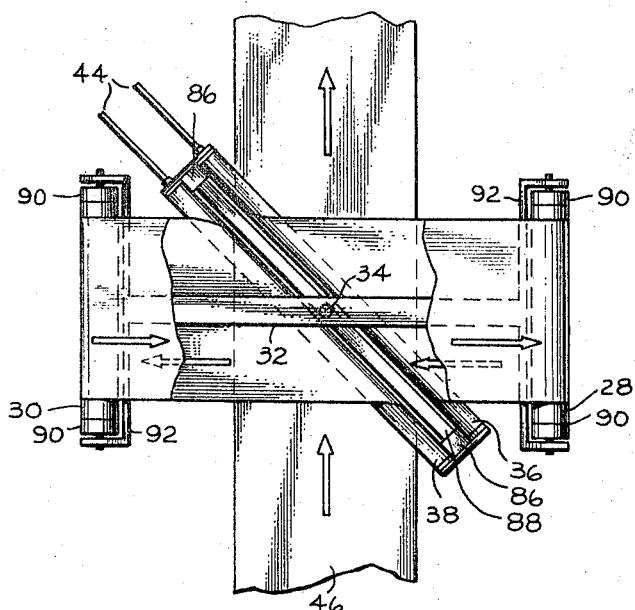
FIGURE 4 is a top view similar to FIGURE 2 but with the transport rotated 180° from its position shown in FIGURE 2.

Now referring to FIGURE 4, it may be seen that the rollers 28 and 30 have been rotated another 90° so that the uppermost path of the strip 46 is now from left to right and the skew bars 28 and 30 have rotated another 45° to accommodate the 90° rotation of the rollers 28 and 30 from the position shown in FIGURE 3.

This result is possible without affecting the velocity or tension in the strip 46 by having the parallel skew bars 36 and 38 pivotable about a common axis and the rollers 28 and 30 pivotable about the same axis.

A practical application of the skew twisting transport 20 is shown in FIGURES 5 through 9. A camera generally indicated at 72 comprises optical elements generally indicated at 74 which oscillate about the axis 76—76 while the film supply and takeup reels 78—78 remain stationary. Thus a portion of the film transport generally indicated at 80 in FIGURE 6 oscillates with the image and a pair of skew bars 82 are provided to accommodate the oscillation of the film path.

Figure 12:
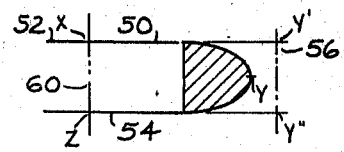
FIGURE 12 is a cross-sectional view taken along the line 12—12 of FIGURE 11.

A plurality of single skew bars may be employed in accordance with the invention when it is desired to transport a strip through a complex path as in the compact camera 84 schematically illustrated in FIGURE 12.

More specifically referring to FIGURE 1, guides 22 and 24 are semicylindrical surfaces defining a common plane for the entrance and exit of the strip 46. Skew bars 36 and 38 are mounted to parallel arms 86, best seen in FIGURE 2. Arms 86 are mounted to a horizontal arm 88 freely pivotable about the shaft 34. Shaft 34 is mounted in the base 26. Arm 32 is pivotable about shaft 34 on a bearing (not shown) to define a common axis X for the arm 32 and the arm 88.

Skew bars 36 and 38 are very smooth low friction surfaces. They may be coated with an antifriction coating, such as fluorocarbon resin. Preferably, they are provided with air bearings by means of a pump 42, tubes 44, and holes 40, as shown in FIGURE 1.

In the particular embodiment illustrated in the drawings, the skew bars 36 and 38 have their lower surfaces lying in the plane of the entering and exiting strip 46. Their upper surfaces also lie in a common plane. The lower surfaces of rollers 28 and 30 lie in this common plane. It should be noted that it is not necessary for the lower surface of the skew bars to lie in the same plane as the entering and exiting strips. Nor is it necessary that their upper surfaces lie in a common plane. Other embodiments of the invention would include the entering and exit strips in different but parallel planes. Rollers 28 and 30 are mounted in bearings 90, mounted to arms 92—92. Arms 92—92 are mounted to arms 32.

Figure 2:
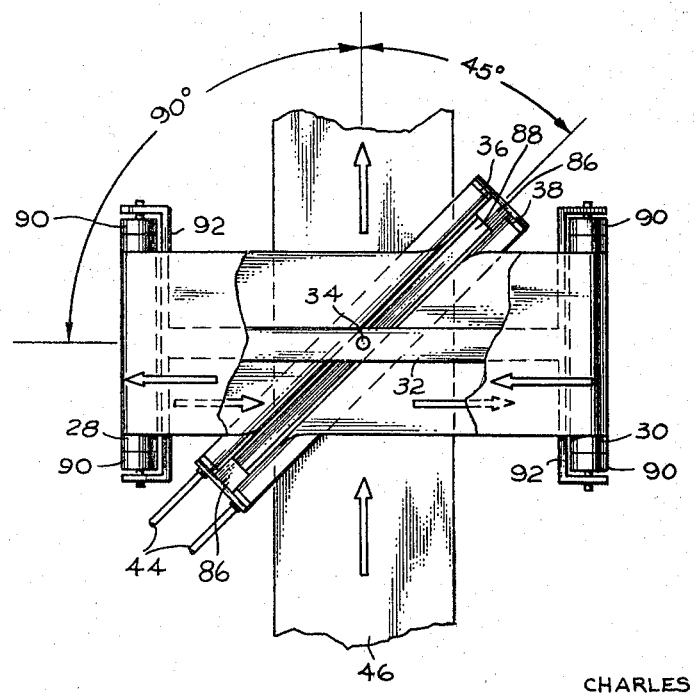
FIGURE 2 is a top view of the transport of FIGURE 1.

The operation of the skew twisting transport 20 to provide full 180° change in path of the upper portion of the transporting strip 46, as illustrated in FIGURES 2 through 4, has been previously described.

Figure 5:
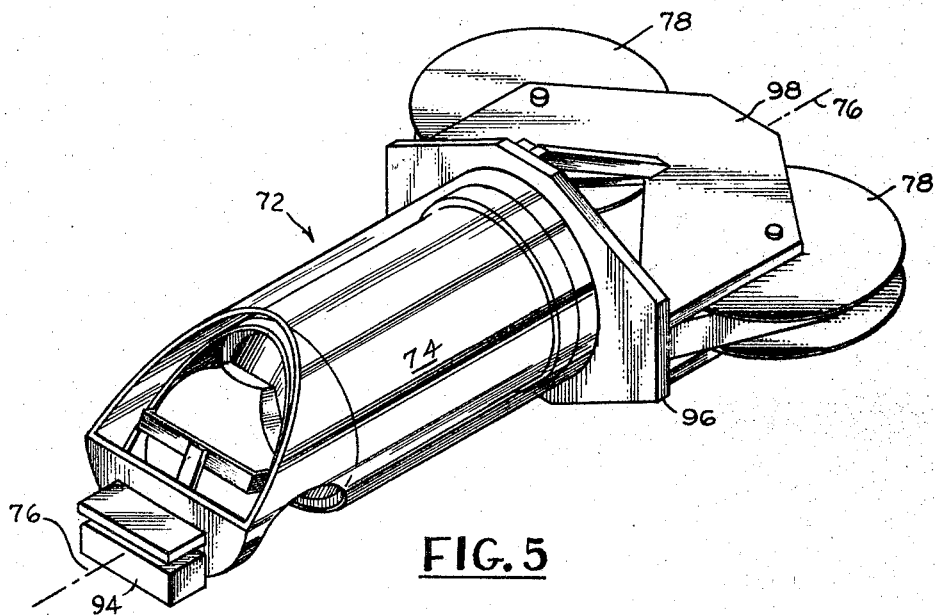
FIGURE 5 is a perspective view of an aerial camera employing a skew twisting transport according to the present invention.

Now referring to FIGURE 5, the optical elements 74 of the camera 72 are oscillable about the axis 76—76. They are mounted on an end bearing 94 and a ring bearing (not shown) in transport support 96.

Motive means for oscillating the optical element 74 with respect to the transport support 96 are conventional and not shown herein. Frame 98 is mounted to fixed support 96. A pair of reels 78—78 are mounted thereto and are driven by conventional means (not shown).

Figure 6:
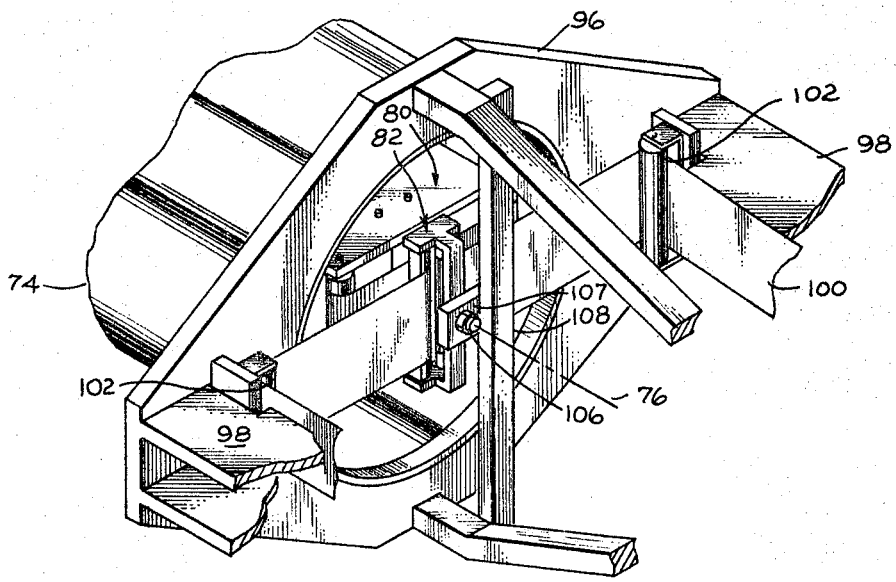
FIGURE 6 is an enlarged perspective view, partially cut away, of the skew twisting transport of the camera of FIGURE 5.

Now referring to FIGURE 6, the film 100 is guided to the reels 78 by fixed rollers 102—102 mounted to frame 98. A pair of skew bars 82 are mounted to a frame 104 and are freely pivotable on a shaft 106 mounted in extension 107 of an arm 108. Arm 108 is a portion of the frame 98. The oscillating portion of the transport, generally indicated at 80, is best seen in FIGURES 7 and 8. It comprises film drum 110, carrying the film 100 past a slit image not shown. Film drum 110 is rotatably mounted in a frame 112. Also mounted in frame 112 are four pairs of guide rollers 114—114 and 116—116. Rollers 114—114 are located to define a parallel path for the film to the skew bars 82 with respect to the paths to the skew bars from the fixed rollers 102—102. The drum 110, frame 112, and rollers 114 and 116 are shown in FIGURES 8 and 9 pivoted about the axis 76 with respect to the frame 98. As shown in FIGURE 9, a rotation of the drum 110 through an angle X produces a rotation of the skew bars 82 through an angle 1/2X.

Figure 15:
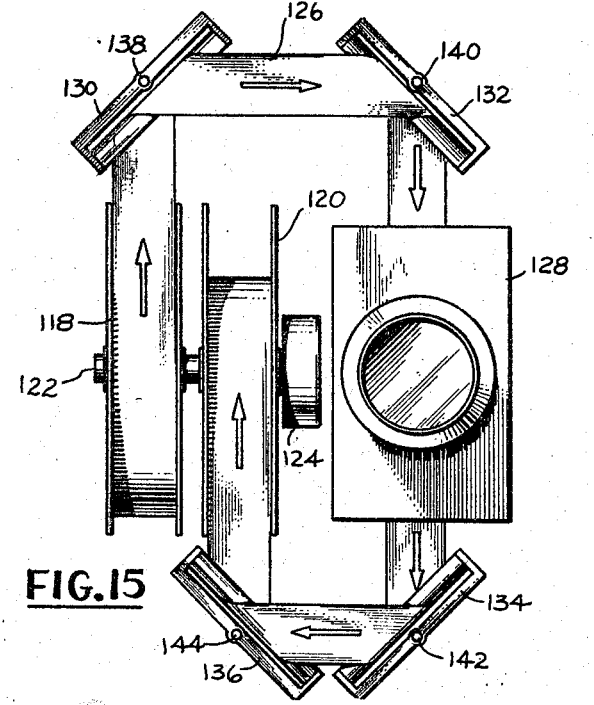
FIGURE 15 is a side view of a camera employing a plurality of single skew bars according to the present invention.

Single self-aligning skew bars may be employed in a complex film transport as in the compact camera 84 schematically shown in FIGURE 15. Here supply reels 118 and 120 are mounted on a common shaft 122. Takeup reel 120 is driven by conventional motive means 124. The film 126 follows a complex path to the optical elements 128 and is guided by a plurality of self-aligning skew bars 130, 132, 134 and 136, each mounted on a pivot 138, 140, 142, and 144. Each of the pivots 138 through 144 are located with respect to their skew bars as is the axis 56 shown in FIGURE 10. Thus, any misalignment of the reels 118 and 120 with respect to each other or with respect to the optical elements 128 is compensated for, as are variations in web widths of the film 126 or other transient disturbances in the transporting film 126, by automatic self-alignment of the skew bars 130 through 136.

Again referring to FIGURES 10, 11 and 12, a self-aligning skew bar 48 provides a generally convex semicylindrical path for a web 50 between parallel entering and exiting planes 52 and 54. The planes 52 and 54 are parallel to the semicylindrical path of the web 50. The self-aligning axis 56 is precisely located with respect to the geometry of the skew bar 48 one-half the distance between the intersections 62 and 64 of a plane 60 perpendicular to planes 52 and 54 and parallel to the semicylindrical path—the distance being measured along the path of the web 50 in the planes 52 and 54 and around the skew bar 48.

Figure 13:
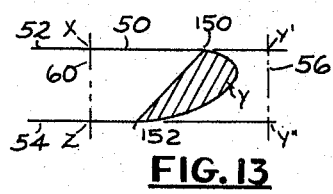
FIGURE 13 is a cross-sectional view, similar to FIGURE 12, of a modified skew bar according to the invention.
Figure 14:
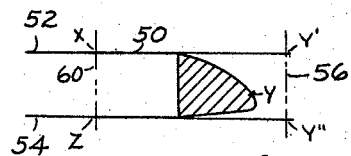
FIGURE 14 is a cross-sectional view, similar to FIGURE 12, of a modified skew bar according to the invention.

Referring to FIGURES 13 and 14, the skew bar need not be symmetrical. For example, in FIGURE 13 the web 50 leaves the plane 52 at line 150 and enters the plane 54 at line 152. The axis 56 is still located one-half the distance between the intersections 62 and 64 of planes 52 and 54. The same is true when the skew bar is shaped as shown in FIGURE 14.

It will thus be seen that I have provided a self-aligning skew bar for a transporting strip, aligned solely by the tension and reaction forces in the strip. The strip may be of any width or thickness. The strip must enter and exit from the skew bar in parallel planes and the skew bar must be of a generally convex cylindrical shape. The axis of the skew bar must be located precisely with respect to the geometry of the skew bar.

Several self-aligning skew bars, according to my invention, may be combined in order to provide a complex multiskewed path for strip material.

A single skew bar allows the supply and takeup means for the strip to be freely movable about the axis of the skew bar so long as the strip enters and exits from the skew bar in parallel planes.

By my invention, a pair of skew bars may be mounted on a common axis and supply means for one skew bar and takeup means for another skew bar may be commonly mounted for rotation about this same axis to provide a skew twisting transport. In this skew twisting transport, the direction of motion of a transporting strip of material may be changed at will through 180°. It will be obvious to those skilled in the art that two such transports may be combined to provide greater than 180° of change in direction.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus of the class described comprising:
   (A) a skew bar,
      (a) having a substantially cylindrical surface,
      (b) about which elongated material is wrapped to form a semicylinder,
      (c) between two straight portions thereof,
         (1) lying in first planes substantially parallel to each other, and
         (2) parallel to said semicylinder;
   (B) a first pivot about which said skew bar is free to rotate, (a) the axis of said first pivot being perpendicular to said first planes, and
(b) spaced from a plane intersecting said straight portions, perpendicular to said first planes, and parallel to said semicylinder, one-half the distance between said intersections as measured in said first planes and about said semicylinder;
(C) skew path guide means,
(a) engaged with and defining the path of one of said straight portions of said elongated material; and
(D) a second pivot about which said guide means may be rotated to change said path,
(a) the axis of said second pivot being substantially coincident with the axis of said first pivot.

2. Apparatus of the class described comprising:
(A) a pair of skew bars,
(a) each having a substantially cylindrical surface,
(b) about which elongated material is wrapped to form a semicylinder,
(c) between two straight portions thereof,
(1) lying in first planes substantially parallel to each other, and
(2) parallel to said semicylinder;
(B) a pair of first pivots about a respective one of which each of said skew bars is free to rotate,
(a) the axis of said first pivot being perpendicular to said first planes, and
(b) spaced from a plane intersecting said straight portions, perpendicular to said first planes, and parallel to said semicylinder, one-half the distance between said intersections as measured in said first planes and about said semicylinder;
(C) said skew bars being parallel; and
(D) said axes of the first pivots being substantially coincident.

3. The skew twisting transport defined in claim 2 wherein:
(D) said guide means are mounted to a common support.

4. The skew twisting transport defined in claim 3 wherein:
(E) said guide means have parallel cylindrical surfaces.

5. The skew twisting transport defined in claim 4 wherein said guide means are right circular rollers.

6. A skew twisting transport for elongated material comprising, in combination:
(A) a pair of skew bars,
(a) formed of parallel cylindrical surfaces,
(b) pivotable about a common axis;
(B) a pair of first guide means for guiding said material to and away from said skew bars,
(a) each of said first guide means defining a first plane with a tangential surface line of a respective one of said skew bars,
(1) said first planes being parallel, and
(C) a pair of second guide means for guiding said material to and away from said skew bars,
(a) each of said second guide means defining a second plane with a tangential surface line of a respective one of said skew bars,
(1) said second planes being parallel to each other, and
(2) parallel to said first planes.

7. The skew twisting transport defined in claim 6 wherein said common axis is spaced from each of two planes (one intersecting said first planes, the other intersecting said second planes, both being parallel to said parallel cylindrical surfaces, and perpendicular to said first and second planes) one-half the distance between said intersections as measured along the path of said material about the respective cylindrical surfaces.

8. The skew twisting transport defined in claim 7 and:
(D) a common support for said pair of second guide means,
(a) rotatable about an axis substantially coincident with said common axis of said skew bars,
(b) said axes being perpendicular to said first and second planes.

9. The skew twisting transport defined in claim 8 wherein said second guide means are parallel cylinders.

10. The skew twisting transport defined in claim 9 wherein said second guide means are right circular rollers.

11. A camera comprising:
(A) optical means providing an image pivotable about an axis;
(B) film supply and takeup means with respect to which said image is pivotable;
(C) a pair of skew bars freely pivotable about said image axis;
(D) a first pair of guide means (102—102),
(a) one fixed with respect to said film supply and one fixed with respect to said film takeup means,
(b) for guiding film from said supply means to one of said skew bars (82) and from the other of said skew bars (82) to said takeup means,
(1) the paths of the film from each of said first pair of guide means to said skew bars being parallel, and
(E) a second pair of guide means (114—114),
(a) fixed with respect to said image,
(b) for guiding film from one of said skew bars (82) to the vicinity of said image and from the vicinity of said image to the other of said skew bars (82),
(1) the paths of the film from each of said second pair of guide means to said skew bars being parallel.

References Cited

UNITED STATES PATENTS

| | | | |
|---|---|---|---|
| 1,630,713 | 5/1927 | Meyer | 226—197 |
| 3,265,272 | 8/1966 | Smith | 226—190 X |

ALLEN N. KNOWLES, *Primary Examiner.*

R. A. SCHACHER, *Assistant Examiner.*

U.S. Cl. X.R.

226—197; 95—11